United States Patent [19]

Hartman, Jr. et al.

[11] Patent Number: 5,705,537

[45] Date of Patent: Jan. 6, 1998

[54] PHENOLIC FOAMS HAVING A LOW FORMALDEHYDE EVOLUTION

[75] Inventors: John J. Hartman, Jr., Millersville; Ronald S. Lenox, Lancaster; Dean L. Putt, Lititz, all of Pa.

[73] Assignee: Armstrong World Industries, Inc., Lancaster, Pa.

[21] Appl. No.: 805,325

[22] Filed: Feb. 24, 1997

[51] Int. Cl.$^6$ ............................................. C08J 9/00
[52] U.S. Cl. .......................... 521/84.1; 521/102; 521/181
[58] Field of Search ........................ 521/84.1, 102, 521/181

[56] References Cited

U.S. PATENT DOCUMENTS

| | | | |
|---|---|---|---|
| 4,219,623 | 8/1980 | Sudan et al. | 521/85 |
| 4,472,165 | 9/1984 | Gregorian et al. | 8/115.7 |
| 4,525,492 | 6/1985 | Rastall et al. | 521/181 |

FOREIGN PATENT DOCUMENTS

| | | | |
|---|---|---|---|
| 873922 | 6/1971 | Canada | 400/6 |

*Primary Examiner*—Morton Foelak

[57] ABSTRACT

Phenolic foam which can be used as insulation is a foamed phenol-formaldehyde resole resin which contains a peptide, a proteinaceous material, cysteine, glutamic acid, glycine, isoleucine, leucine, lysine, phenylalanine, serine, tryptophan, or mixtures thereof at an amount effective to reduce emission of free formaldehyde from the foamed resin.

13 Claims, No Drawings

(12)

PHENOLIC FOAMS HAVING A LOW FORMALDEHYDE EVOLUTION

BACKGROUND OF THE INVENTION

Field of the Invention

To produce phenolic resole foams, an excess of formaldehyde is used. Resole resins are formed when phenol alcohols are reacted with an excess of formaldehyde in the presence of an alkaline catalyst. After the formaldehyde addition, the resin is cooled before the final curing can occur. Later the reaction can be resumed by the addition of heat and acid. A blowing agent is added to cause the foam to form.

Phenolic resole foams can be useful as insulation, but these foams, by the very nature of the resole resins that are used to make them, contain free formaldehyde. The formaldehyde given off by the foams is a hazard to health and the environment. Formaldehyde is known to be a skin and eye irritant. Recent studies indicate that formaldehyde is mutagenic and carcinogenic.

Attempts have been made to reduce formaldehyde emissions. U.S. Pat. No. 4,525,492 discloses phenolic foam compositions having urea, melamine, and dicyandiamide to reduce the amount of free formaldehyde in the foam. Unfortunately, however, urea, melamine, and dicyandiamide are corrosive to the copper metal that the foams frequently come into contact with, especially when the foams are used as pipe insulation.

It would be advantageous to be able to reduce formaldehyde emissions from the phenolic resole resin foams without causing metal corrosion.

The present invention provides phenolic resole resin foams which have lower free formaldehyde levels in the phenolic foam. Processes for the production of these foams are also provided.

SUMMARY OF THE INVENTION

Phenolic foam which can be used as insulation comprises a foamed phenol-formaldehyde resole resin which contains a peptide, a proteinaceous material, cysteine, glutamic acid, glycine, isolucine, leucine, lysine, phenylalanine, serine, tryptophan, or mixtures thereof at an amount effective to reduce emission of free formaldehyde from the foamed resin. There are no residual ammonia, urea, or amines present in the phenolic foam of the present invention, and thus, advantageously, the risk of corrosion such as copper pipe corrosion is eliminated.

The additives to reduce formaldehyde emissions can be combined with the other foam ingredients either before or during the foaming of the resole resin mixture. Preferably, the foam can be made by combining phenol-formaldehyde resole resin, a blowing agent, a surfactant, an acid catalyst and a peptide, a proteinaceous material, cysteine, glutamic acid, glycine, isolucine, leucine, lysine, phenylalanine, serine, tryptophan, or mixtures thereof to form a homogeneous mixture, and heating the mixture at a temperature sufficient to cause foam formation and resin curing. Suitably the temperature may be in the range of from about 24° to about 150° C. to cause foaming and curing of the resin.

DETAILED DESCRIPTION

Phenol-formaldehyde resole resins are well known and are available commercially. They may also be prepared using methods known to the art. Such resins are prepared using a molar excess of formaldehyde relative to the phenolic reactant. The present invention offers foams with ingredients which reduce formaldehyde emissions from the foams prepared with the phenol resole resins.

Additives to the phenol-formaldehyde resole resin foams which serve to decrease the formaldehyde emissions are a peptide, a proteinaceous material, cysteine, glutamic acid, glycine, isolucine, leucine, lysine, phenylalanine, serine, tryptophan, or mixtures thereof. Such additives are used at an amount effective to reduce the emission of free formaldehyde from the foamed resin. Such amounts are generally from about 3 to about 100 parts by weight per hundred parts by weight of the phenol-formaldehyde resole resin. The maximum amount which may be used is limited by the viscosity of the homogeneous mixture which is to be foamed. At the larger concentrations of the formaldehyde reducing additive, the homogeneous mixture becomes too viscous, and mixing and foaming will be difficult. The minimum amount used depends on the effectiveness of the ingredient in reducing the formaldehyde emissions when the additive is used in small amounts.

Preferably, the formaldehyde reducing additive is used at an amount in the range of from about 10 to about 75 parts by weight per hundred parts by weight of the phenol-formaldehyde resole resin.

Several amino acids have been found to be effective in reducing formaldehyde evolution in phenolic foam. These are: cysteine, glutamic acid, glycine, isolucine, leucine, lysine, phenylalanine, serine, and tryptophan. These compounds can be used alone, or in combination with each other or a proteinaceous material or any peptide. The preferred amino acids to use (either alone or in a combination) are glutamic acid, isolucine, lysine, leucine, and serine.

Peptides which may be used include dipeptides and polypeptides.

Proteinaceous materials which may be used include animal glue, collagen, gelatin, hydrolyzed collagen, leather, refined soy protein, and other vegetable proteins, shellac, and hydrolyzed proteins. Preferred materials to reduce formaldehyde emissions are soy protein, leather, and gelatin. The most preferred proteinaceous materials are gelatin and soy protein.

It has been noted that the particular Bloom of the gelatin has no effect on its use. The particle size of the gelatin, however, does effect the end viscosity of the mixture. The amount of gelatin which can be added can be influenced by particle size of the gelatin being used. If more gelatin is desired it may be easier to achieve a workable mixture by increasing the particle size of the gelatin being used. Preferably, when gelatin is used, the average particle size of the gelatin is from about 150 mesh to about 10 mesh. A most preferred gelatin particle size is in the range of from about 50 to about 20 mesh.

One advantage to the present phenolic foam insulation is that the phenolic foam is inherently fire resistant due in part to its char-forming characteristics. It is, thus, preferred and advantageous to use additives that are good char formers and are naturally fire resistant. For this reason, therefore, proteinaceous materials are preferred (they are known as good char-formers). Of the proteinaceous materials, most preferred is gelatin.

To prepare the phenol-formaldehyde resole foam insulation, a blowing agent, a surfactant, and an acid catalyst are also included. One or more blowing agents which can suitably be included, for example, are acetone, cyclopentane, dichlorofluoroethane, ethyl ether, hexane, pentane, mixtures of alkanes such as pentane and hexane, and petroleum ether. A preferred blowing agent can be selected from the group consisting of dichlorofluoroethane, pentane, and petroleum ether and mixtures thereof.

The blowing agent is suitably used at an amount in the range of from about 5 to about 40 pphr (parts by weight per hundred parts by weight of the phenol-formaldehyde resole resin). Preferably it is used at an amount in the range of from about 8 to about 25 pphr, and most preferably at an amount in the range of from about 15 to 20 pphr.

One or more surfactants which can suitably be included, for example, are ammonium lauryl sulfate, dimethylpolysiloxane, disodium lauryl sulfosuccinate, disodium lauryl alcohol sulfosuccinate, disodium lauryl sulfosuccinate, disodium oleth-3-sulfosuccinate, dodecylbenzene sulfonate, furfuryl alcohol, glycerin, octylphenoxypolyethoxyethanol, polyalkylene oxidemethylsiloxane, sodium lauryl ether sulfate, sodium lauryl sulfate, and sorbitol. A preferred surfactant can be selected from the group consisting of dimethylpolysiloxane, glycerin, octylphenoxypolyethoxyethanol, sorbitol, and mixtures thereof.

The surfactant can be included at an amount of from about 1 to about 40 pphr. Preferably the surfactant is used at an amount in the range of from about 1 to about 20 pphr, and most preferably the surfactant is used at an amount in the range of from about 5 to about 10 pphr.

The surfactant is added to assist in combining the various ingredients with the resin and assist in cell formation during the expansion phase of the foam forming process. Cell formation (open or closed and large or small) can frequently be influenced by the surfactant. For example, when a product having finer cells is desired, a surfactant containing lauryl sulfate is preferably used. Similarly, to obtain open cells in the product, a surfactant containing sulfosuccinate is preferably used. Surfactant blends that are preferred for specific properties are for example: a surfactant containing sodium lauryl sulfate and disodium lauryl sulfosuccinate is preferably used to produce a fine, open celled foam.

One or more acid catalysts which can suitably be used, for example, include para-toluene sulfonic acid, phenolsulfonic acid, phosphoric acid, and sulfuric acid. Preferred acid catalysts are combinations which include, for example, sulfuric acid and ethylene glycol, sulfuric acid and diethylene glycol, and sulfuric acid, para-toluene sulfonic acid and water. A preferred acid catalyst can be selected from the group consisting of: phenolsulfonic acid, sulfuric acid, para-toluene sulfonic acid, and mixtures thereof. In some preferred embodiments, these preferred acids are mixed with water or ethylene glycol.

The acid catalyst can suitably be used at an amount in the range of from about 3 to about 30 pphr. Preferably the acid catalyst is used at an amount in the range of from about 5 to about 20 pphr, and most preferably the acid catalyst is used at an amount in the range of from about 5 to about 15 pphr.

Most of the ingredients to the foam are water soluble and can be prepared or dispersed in an aqueous media. It is preferred, however, to disperse the ingredients as dry powders. The inclusion of additional water may be detrimental to the foam characteristics. Often the added water results in pockets or voids in the resulting foam. The total water content of the homogeneous mixture may be as high as about 15% by wt., although it is preferred to have the water content up to about 10% by weight (wt.), and it is most preferred to maintain the water content of the homogeneous mixture in the range of from about 3 to about 5% by weight of the entire homogeneous mixture before foaming.

After a homogeneous mixture is formed from the ingredients, the mixture is heated at a temperature sufficient to cause foam formation and resin curing. The operational temperature of the blowing agent will determine the temperature of foam formation. The temperature may be in the range of from about 24° to about 150° C. If a particular form of insulation is desired, such as pipe insulation, the homogeneous mixture can be put into a mold before heating.

EXAMPLES

Procedure

In the examples that follow the surfactant was added to the resole resin, followed by the addition of the formaldehyde reducing additive being used, the blowing agent and the acid, in that order. Each ingredient was added one at a time and the mixture was stirred until the added ingredient was dissolved or dispersed into the resin before adding the next ingredient. The homogeneous mixture obtained after the addition of all the ingredients was then poured into a mold and then it was cured in an oven at 93° C. for 30 minutes.

TABLE 1

| Formulation Ingredients | Parts by Wt. Ex. 1 | Parts by Wt. Ex. 2 |
| --- | --- | --- |
| resole resin | 100 | 100 |
| dimethylpolysiloxane | 10 | 10 |
| gelatin | 0 | 50 |
| pentane (blowing agent) | 17 | 17 |
| catalyst | 5 | 5 |

The resole resin used was Plenco 12067 from Plastics Engineering Co. The catalyst used was sulfuric acid/para-toluene sulfonic acid/water at 1 part sulfuric acid, 2 parts para-toluene sulfonic acid and 2 parts water. The dimethylpolysiloxane was the surfactant and the formaldehyde reducing additive was the gelatin.

The foams resulting from these examples had densities in the range of 1.0 lb/ft$^3$ (pounds per cubic foot) for example 1 and 1.6 lb/ft$^3$ for example 2.

The thermal conductivity of the foam samples produced were also measured using ASTM C-518 with the following results (W/m°K is watt/meter degree Kelvin):

| Example 1 | 0.0377 W/m° K. at 70° F. | 0.0394 W/m° K. at 104° F. |
| Example 2 | 0.0350 W/m° K. at 70° F. | 0.0367 W/m° K. at 104° F. |

For all of the examples the free formaldehyde levels were determined on an Interscan Formaldehyde Analyzer, Model LD16, Interscan Corporation, Chadsworth, Calif. The analysis had the following result. The accuracy of the formaldehyde emission readings are within about 10% of the chart value given.

Example 1 had a formaldehyde emission of 5223 µg/m$^2$/hr (micro gram/square meter/hour).

Example 2 had a formaldehyde emission of 1525 µg/m$^2$/hr.

EXAMPLES 3–28

Another control foam was made which contained no formaldehyde scavenger (Example 3), while at the same time other foams were made that were identical to this foam in order to determine the effectiveness of other ingredients in reducing the formaldehyde evolution (Examples 4–28).

The results of this study are indicated in the table below. In the table below the ingredient used for the reduction of formaldehyde emission was added in units of parts by weight per hundred parts of the phenol resin (pphr). The formaldehyde emission is given in units of µg/m²/hr (micro gram/square meter/hour). Formaldehyde emission was tested using the Formaldehyde Analyzer, Model LD16, Interscan Corporation. The accuracy of the formaldehyde emission readings are within about 10% of the chart value given.

TABLE 2

| Example No. | Ingredient | Concentration | Formaldehyde Emission |
|---|---|---|---|
| 3 | | 0 | 5370 |
| 4 | animal glue | 50 | 3336 |
| 5 | aspartame | 20 | 1971 |
| 6 | aspartic acid | 20 | 5128 |
| 7 | collagen | 20 | 5137 |
| 8 | cysteine | 20 | 1070 |
| 9 | dry milk | 20 | 5352 |
| 10 | egg albumin | 20 | 5407 |
| 11 | gelatin | 20 | 2896 |
| 12 | glutamic acid | 20 | 0 |
| 13 | glycine | 20 | 3452 |
| 14 | isoleucine | 20 | 0 |
| 15 | keratin | 20 | 5284 |
| 16 | leather | 20 | 4761 |
| 17 | leucine | 20 | 0 |
| 18 | lysine | 20 | 524 |
| 19 | melamine | 20 | 1231 |
| 20 | phenylalanine | 20 | 1861 |
| 21 | serine | 20 | 866 |
| 22 | soy protein | 20 | 3184 |
| 23 | tryptophan | 20 | 0 |
| 24 | urea | 20 | 396 |
| 25 | valine | 20 | 4555 |
| 26 | wood flour | 20 | 2945 |
| 27 | casein | 20 | 5297 |
| 28 | shellac | 20 | 3217 |

EXAMPLES 29–33

Using the previously described procedure, samples of phenolic foam were prepared. Each of the samples had a different amount of gelatin in the sample. The sample for Example 3 was the control and had no agent added to stop formaldehyde emissions. Examples 30 and 31 show formaldehyde emissions at different gelatin levels. The results of this study are indicated in the table below. In the table below the ingredient used for the reduction of formaldehyde emission was added in units of parts by weight per hundred parts of the phenol resin (pphr). The formaldehyde emission is given in units of µg/m²/hr (micro gram/square meter/hour). Formaldehyde emission was tested using the Formaldehyde Analyzer, Model LD16, Interscan Corporation. The accuracy of the formaldehyde emission readings are within about 10% of the chart value given.

TABLE 3

| Example No. | Gelatin Concentration | Emission Level |
|---|---|---|
| 29 | 10 | 1364 |
| 30 | 25 | 1188 |
| 31 | 75 | 784 |

We claim:

1. A phenolic foam useful as insulation comprising a foamed phenol-formaldehyde resole resin which contains a formaldehyde reducing additive which is a peptide, a proteinaceous material, cysteine, glutamic acid, glycine, isoleucine, leucine, lysine, phenylalanine, serine, tryptophan, or mixtures thereof at an amount effective to reduce emission of free formaldehyde from the foamed resin.

2. A phenolic foam as described in claim 1 wherein the formaldehyde reducing additive is present at an amount in the range of from about 10 to about 75 parts by weight per hundred parts by weight of the phenol-formaldehyde resole resin.

3. A phenolic foam as described in claim 1 which further is thermal insulation.

4. A phenolic foam as described in claim 1 which further contains a surfactant at an amount in the range of from about 1 to about 40 parts by weight per hundred parts of the foamed phenol-formaldehyde resole resin.

5. A phenolic foam as described in claim 1 wherein the formaldehyde reducing additive is gelatin.

6. A phenolic foam as described in claim 1 wherein the formaldehyde reducing additive is glutamic acid.

7. A phenolic foam as described in claim 1 wherein the formaldehyde reducing additive is isoleucine or leucine.

8. A phenolic foam as described in claim 1 wherein the formaldehyde reducing additive is present at an amount in the range of from about 3 to about 100 parts by weight per hundred parts by weight of the phenol-formaldehyde resole resin.

9. A phenolic foam as described in claim 1 wherein the formaldehyde reducing additive is tryptophan.

10. A process for the preparation of a phenolic foam having reduced formaldehyde emissions comprising the steps of: mixing a peptide, a proteinaceous material, cysteine, glutamic acid, glycine, isoleucine, leucine, lysine, phenylalanine, serine, tryptophan, or mixtures thereof at an amount effective to reduce the emission of formaldehyde, with a phenol-formaldehyde resole resin, a blowing agent at an amount in the range of from about 5 to about 40 parts by weight per hundred parts of phenol-formaldehyde resole resin, and an acid catalyst at an amount in the range of from about 3 to about 30 parts by weight per hundred parts of phenol-formaldehyde resole resin, and heating at a temperature sufficient to cause foam formation and resin curing.

11. The process of claim 10 wherein the heating takes place simultaneously with the mixing.

12. The process of claim 10 wherein mixing is completed to form a homogeneous mixture which is then subjected to the heating step.

13. The process of claim 10 wherein a surfactant is also present at an amount in the range of from about 1 to about 40 parts by weight per hundred parts of phenol-formaldehyde resole resin.

* * * * *